United States Patent
Hartmann et al.

(10) Patent No.: US 7,974,764 B2
(45) Date of Patent: Jul. 5, 2011

(54) PROCEDURE FOR THE REDUCTION OF THE TORQUE OF AN INTERNAL COMBUSTION ENGINE

(75) Inventors: Dirk Hartmann, Stuttgart (DE); Werner Mezger, Eberstadt (DE); Andreas Roth, Muehlacker-Lomersheim (DE); Juergen Rappold, Iisfeld-Auenstein (DE); Georg Mallebrein, Korntal-Muenchingen (DE); Nikolas Poertner, Stuttgart (DE); Henri Barbier, Schwieberdingen (DE); Ingo Fecht, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 922 days.

(21) Appl. No.: 11/881,060

(22) Filed: Jul. 25, 2007

(65) Prior Publication Data

US 2008/0027623 A1    Jan. 31, 2008

(30) Foreign Application Priority Data

Jul. 31, 2006  (DE) .......................... 10 2006 035 282

(51) Int. Cl.
*F02D 28/00* (2006.01)
*F02D 45/00* (2006.01)

(52) U.S. Cl. ..................................... 701/104; 123/198 F
(58) Field of Classification Search .................. 701/104, 701/103, 102, 84; 123/478, 481, 198 F, 198 DB; 180/197

See application file for complete search history.

(56) References Cited

U.S. PATENT DOCUMENTS

| 4,437,442 | A | * | 3/1984 | Yamaguchi | 477/111 |
| 5,737,713 | A | * | 4/1998 | Ikeda et al. | 701/84 |
| 5,787,855 | A | * | 8/1998 | Mueller et al. | 123/198 F |
| 6,978,204 | B2 | * | 12/2005 | Surnilla et al. | 701/103 |
| 7,051,704 | B2 | * | 5/2006 | Kawamura | 123/322 |
| 7,146,966 | B2 | * | 12/2006 | Nakamura | 123/481 |

FOREIGN PATENT DOCUMENTS

JP     2001-289078 A  * 10/2001

* cited by examiner

*Primary Examiner* — Hieu T Vo
(74) *Attorney, Agent, or Firm* — Merchant & Gould P.C.

(57) ABSTRACT

In order to achieve at least a short-term reduction of the torque of an internal combustion engine, which comprises a range as widely adjustable as possible, causes a slight as possible thermal stress on the components of the attached exhaust gas system and allows for a reduction of the fuel consumption, it is proposed that in addition to the cut off of the fuel-delivery control phase of a cylinder, an intake valve associated with the cylinder is cut off.

9 Claims, 3 Drawing Sheets

PROCEDURE FOR THE REDUCTION OF THE TORQUE OF AN INTERNAL COMBUSTION ENGINE

Figure 1:
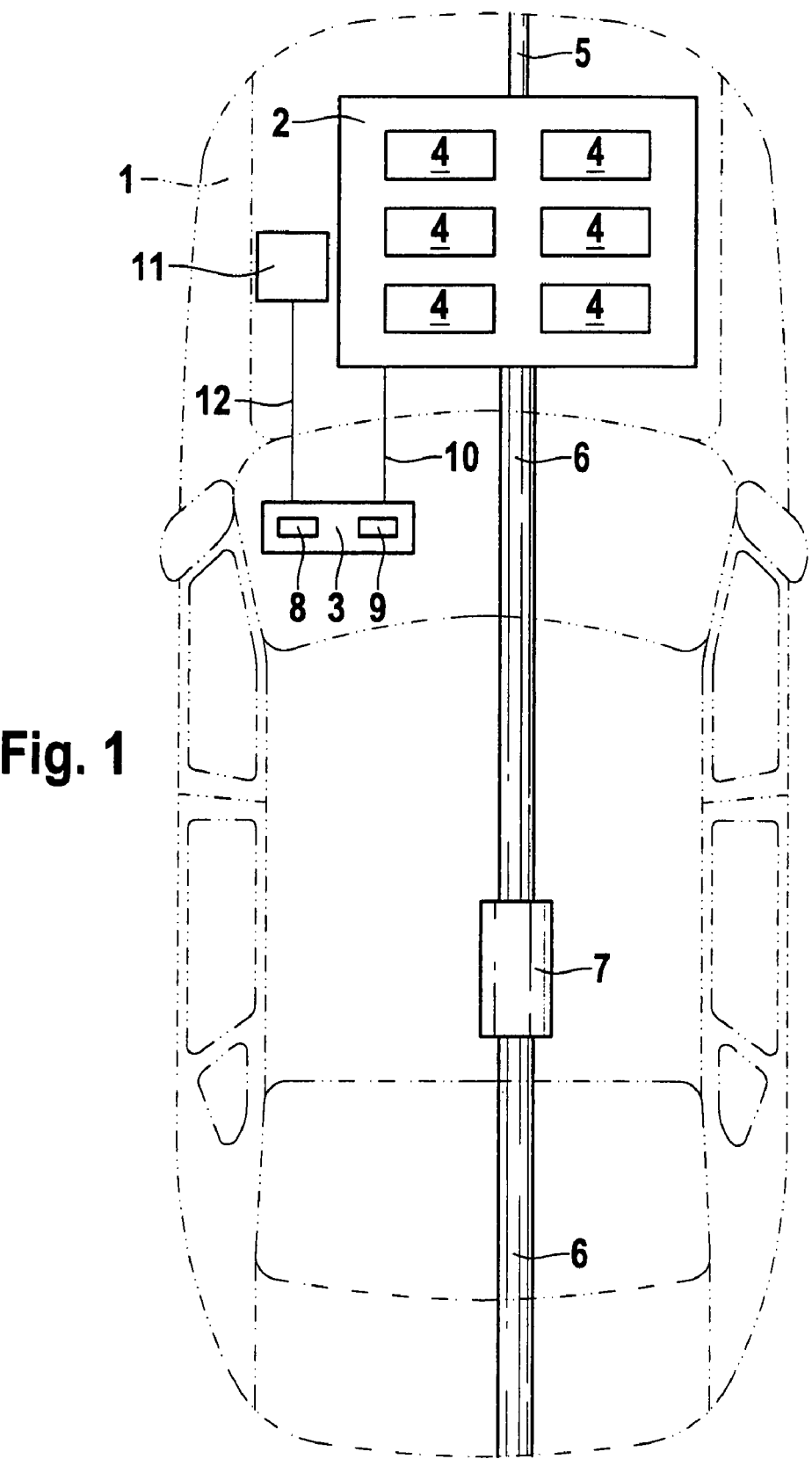

The invention concerns a procedure for the operation of an internal combustion engine comprising at least one cylinder, in which a reduction of the torque, which is at least short-term, is implemented as a function of a reduced demand by cutting off a fuel-delivery control phase assigned to the cylinder.

The invention additionally concerns a control unit for the open-loop and closed-loop control of an internal combustion engine comprising at least one cylinder, whereby the control unit has wherewithal for the acquisition of a reduced torque demand and wherewithal for the cutoff of a fuel-delivery control phase assigned to the cylinder.

Furthermore, the invention concerns an internal combustion engine, which has at least one cylinder and a metering device for the fuel-delivery control phase assigned to the cylinder, whereby wherewithal is attached to the internal combustion engine for cutting off the fuel-delivery control phase as a function of a reduced torque demand.

The invention also concerns a computer program, which can be run on a computer, particularly in a control unit for the open-loop and closed-loop control of an internal combustion engine.

During the operation of an internal combustion engine, for example a gasoline engine or a diesel engine, a continuous open-loop control, respectively closed-loop control, of the torque produced by the internal combustion engine takes place. This allows for the implementation of an actual torque demand, which, for example, reflects the drive input acquired by means of a pedal value sensor, which is actuated by a driver. Additional increased torque demands can result from switching on accessory loads, for example an air conditioner. If the accessory loads are switched off again, the internal combustion engine is controlled as a function of the present reduced torque demand resulting from this in order to again reduce the torque. In so doing, an optimal fuel-air mixture is determined as a function of many actual operating variables, and control values assigned to the internal combustion engine are actuated accordingly. The control variables comprise particularly a metering device, with which the quantity of the fuel to be metered can be specified for individual or multiple cylinders. Metering devices of this kind are, for example, fuel injection valves, which allow for an injection of the fuel into an intake manifold associated with one or several cylinders or a direct injection into a combustion chamber designed in the cylinder.

Beside reduced torque demands, which are focused on a reduction of torque over a longer term, reduced torque demands can arise, which require a short-term intervention into the engine management system for a short-lived reduction of the torque. Reduced torque demands of this kind are, for example, produced by an activation of an electronic stability program (ESP) during the gear shifting operation of a transmission or by the intervention of an overspeed trip unit.

When short-term reduced torque demands of this kind are being performed, it is desirable to reduce the torque as quickly as possible, because the reduced torque demand can be cancelled under certain circumstances even before the torque could be reduced. Additionally a particularly rapid implementation is often unavoidable due to safety reasons, for example, when there is a reduced torque demand, which was produced by an ESP. A fundamental standard for the operation of an internal combustion engine is furthermore to target in all operating situations a fuel consumption, which is as small as possible, and a proportion of toxic substances, which is as small as possible in the exhaust gas produced during combustion.

In order to achieve a reduction in the torque as quickly as possible, making provision for a retardation of the ignition angle is known. This allows for a rapid reduction of the torque without the quality of the exhaust gas changing significantly in the process. A retardation of the ignition angle, however, has the disadvantage that the adjustable range, which is predetermined by the combustion limit of the fuel-air mixture in the combustion chamber, is relatively small. A reduction of the torque by means of a retardation of the ignition angle is thus only possible up to this limit. For this reason, a reduced torque demand often cannot be completely implemented.

The retardation of the ignition angle additionally causes a thermodynamically reduced degree of efficiency because more thermal energy is produced in combustion during the ignition angle retardation. Furthermore, components present in an exhaust gas system connected to the internal combustion engine, for example a catalytic converter, are thermodynamically stressed to a greater degree, which can lead to a premature deterioration of the components.

It is also known how a reduced torque demand is implemented by the cutting off of a fuel-delivery control phase assigned to the cylinder. If the fuel-delivery control phase takes place by fuel injection, this procedure is also denoted as injection fade-out. The injection fade-out has the advantage over the retardation of the ignition angle, in that the torque delivered by the internal combustion engine can be reduced in stages—based on the number of the fuel injection valves, which can be deactivated—down to zero. In connection with a retardation of the ignition angle, reduced torque demands often lend themselves to only be completely implemented.

The injection fade-out leads, however, to a reduction of the quality of the exhaust gas because the oxygen contained in the fresh air travels across the cylinder, whose fuel injection has been faded out, and out of its now non-combusted air into the catalytic converter and can chemically react with hydrocarbons, which might be present there. This leads further to a thermal load, which can consequently result in the deterioration of the catalytic converter. In order to avoid a deterioration of the catalytic converter, a reduction of the torque is, therefore, often prevented or interrupted if the catalytic converter is already over heated.

If the injection fade-out is used in an intake manifold fuel injection, a wall film formed by the fuel in the intake manifold is broken down by the air flow when the fuel injection valves are switched off, whereby hydrocarbons travel through the cylinder into the exhaust gas system. In order to achieve an efficient operation of the internal combustion engine during a reactivation of the fuel injection valves, the wall film has to be built up as quickly as possible. This is achieved by a short-term enrichment of the fuel-air mixture during reactivation of the fuel injection valves, which consequently leads to an increase in fuel consumption.

The task underlying the invention is, therefore, to create a possibility for at least a short-term reduction of the torque of an internal combustion engine, which comprises a range as widely adjustable as possible and at the same time produces a lower thermal stress on the components in the exhaust gas system, particularly the catalytic converter. It is additionally the task of the invention to achieve a more favorable reduction of the torque with regard to the fuel consumption.

The task is solved by a procedure of the kind mentioned at the beginning of the application, in that an intake valve associated with the cylinder is cut off. If multiple intake valves are associated with the cylinder, preferably all intake valves are then cut off. This has the effect that less or no air can travel through the combustion chamber of the cylinder into the exhaust gas system and react there during the cut off of the fuel-delivery control phase. The thermal stress of the catalytic converter can, therefore, be effectively reduced.

If the metering device is designed as intake manifold fuel injection, the procedure according to the invention thus reduces or prevents the break down of the wall film in the intake manifold when the fuel-delivery control phase is cut off. This results because no air flows any longer through the intake manifold and combustion chamber into the exhaust gas system.

Preferably an exhaust valve associated with the cylinder is additionally cut off. This prevents even more securely an escape of air from the combustion chamber into the exhaust gas system when the fuel-delivery control phase is cut off.

In a particularly advantageous form of embodiment of the procedure according to the invention, the intake valve or the intake valve and the exhaust valve are synchronously cut off with the metering device. At this juncture the times to valve closure, which are necessary for the cut off of the intake valve and the exhaust valve, are preferably taken into account. Because the times to valve closure for the position of the intake valve and the exhaust valve normally lie in each case above the reaction time of the metering device, the intake valves, respectively exhaust valves, are accordingly actuated earlier, so that the cutoff of the intake valves, respectively exhaust valves, and the fuel-delivery control phase occur simultaneously.

The cutoff of the intake valves prevents oxygen from traveling into the exhaust gas system by way of the non-combusted air from the intake manifold. For this reason an intervention, which reduces the torque, by way of cutting off the fuel-delivery control phase in combination with the cutoff of the associated intake valves can always occur in the procedure according to the invention without having to fear that overheating of and damage to the catalytic converter take place. A cut off of the fuel-delivery control phase must, therefore, no longer be prevented or discontinued due to an overheating of the catalytic converter or one of the other components of the exhaust gas system.

By cutting off the exhaust valves, the escape of a so-called leakage air from the crankshaft housing across seals into the combustion chamber and then into the exhaust gas system can additionally be prevented. Charge cycle losses of the internal combustion engine are furthermore decreased by the cutoff of the exhaust valves, which contributes to an improvement of the entire degree of efficiency of the internal combustion engine.

When the fuel-delivery control phase and the intake valves are cut off in combination or the fuel-delivery control phase and the intake and exhaust valves in combination, the air supply into the exhaust gas system is consequently interrupted so that the air-fuel ratio remains unchanged in the exhaust gas. For this reason a so-called lambda closed-loop control, which is deployed for an optimal control of the air-fuel ratio, can continue to work even during the cut off of the fuel-delivery control phase and does not have to be cut off—as was usual until now.

According to a preferred form of embodiment of the procedure according to the invention, a reduction stage is ascertained. As a function of the reduction stage ascertained, a determination is made about how many cylinders are cut off, which cylinders are cut off, if intake valves are cut off or if exhaust valves are cut off. These parameters influence to a greater or lesser degree the efficiency of the reduction of the torque. Therefore, by an appropriate combination of these parameters, a reduction of the torque can be achieved, which as accurately as possible corresponds to the reduced torque demand.

Preferably the intake valve or the exhaust valve is cut off by means of an electromechanical valve control system or a mechanical servo-concept. Because internal combustion engines often presently have one of these valve control systems already available, the procedure according to the invention allows itself to be cost effectively implemented.

The task is also thereby solved by a control unit of the kind mentioned at the beginning of the application as well as by an internal combustion engine of the kind mentioned at the beginning of the application, in that the control unit, respectively the internal combustion engine, is equipped for the implementation of the procedure according to the invention.

The task is furthermore thereby solved by a computer program of the kind mentioned at the beginning of the application, in that the computer program is programmed for the implementation of the procedure according to the invention if the computer program runs on a computer. For this reason, the computer program likewise represents the invention as does the procedure, for whose execution the computer program is programmed.

Figure 2:
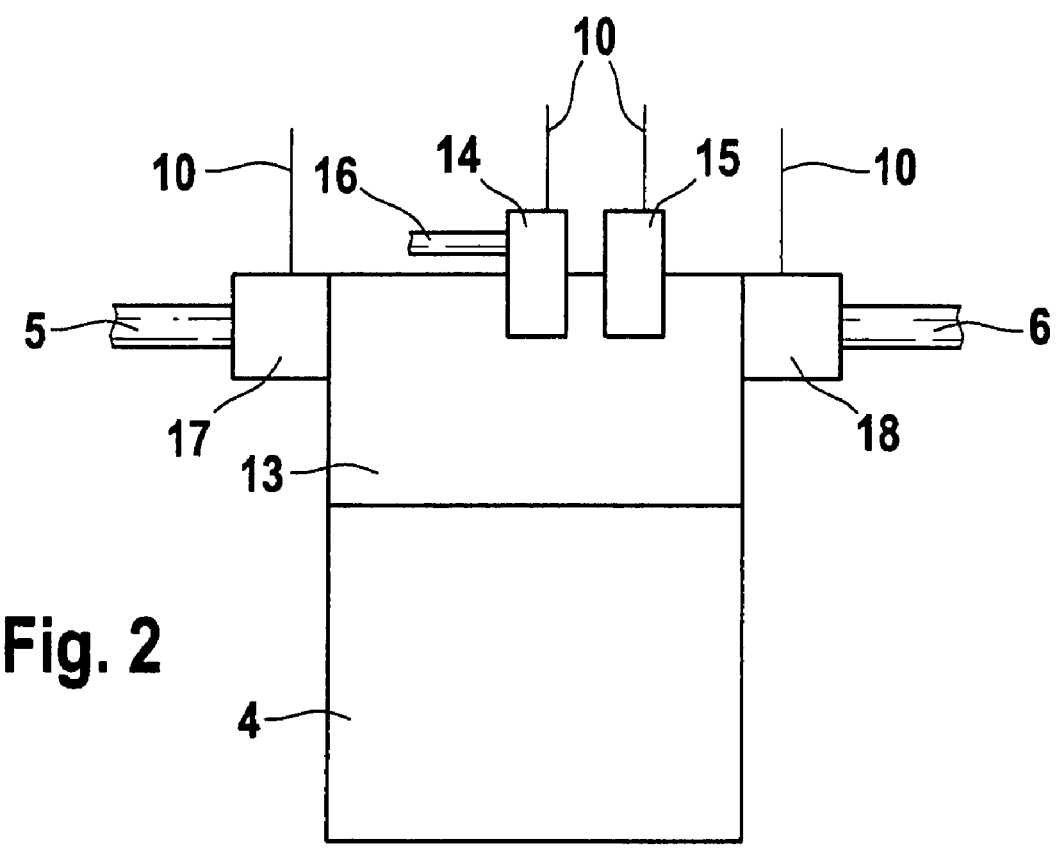

Additional application possibilities and advantages of the invention result from the following description of the examples of embodiment of the invention, which are represented in the diagrams. They show:

FIG. 1 a diagramed depiction of a motor vehicle comprising an internal combustion engine and a control unit, which is equipped for the implementation of the procedure according to the invention;

FIG. 2 a diagramed depiction of a cylinder; and

Figure 3:
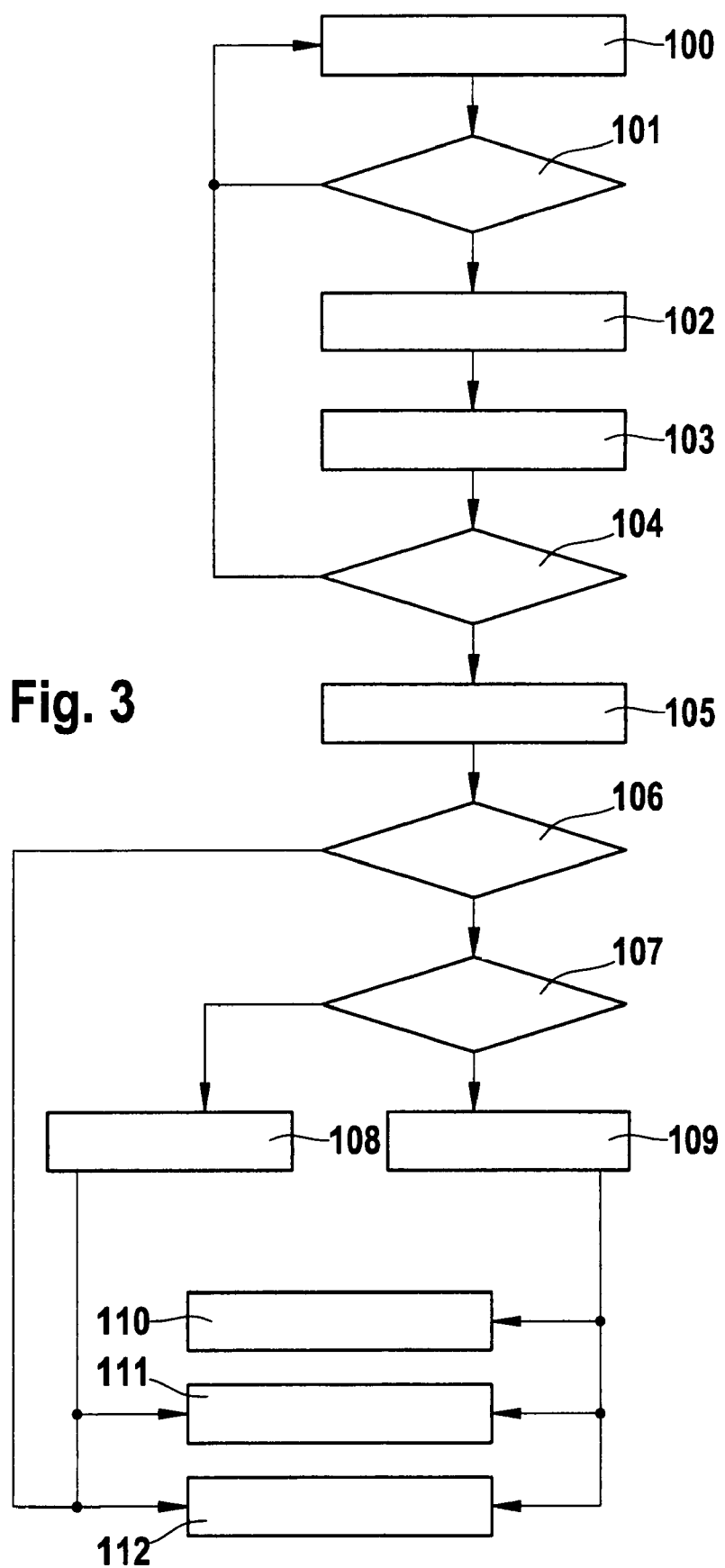

FIG. 3 a diagramed flowchart of an example of embodiment of the procedure according to the invention.

A motor vehicle is depicted boldly schematized in FIG. 1, which comprises an internal combustion engine 2 and a control unit 3. The internal combustion engine 2 has cylinders 4. An air intake system 5 and an exhaust gas system 6 are attached to the internal combustion engine 2. A catalytic converter 7 is disposed in the exhaust gas system 6.

The control unit 3 has a processor 8 and a storage element 9. In the storage element 9 a computer program, for example, is stored, which is capable of implementing the procedure according to the invention if it runs in the control unit 3, whereby the individual procedural steps, for example, are executed by the processor 8.

The control unit 3 is connected to the internal combustion engine 2 by way of one or multiple signal lines 10. Values describing an operating state of the internal combustion engine 2 can, for example, be transmitted from the internal combustion engine 2 to the control unit 3 by way of the signal lines 10. Via the signal lines 10, the control unit 3 additionally can intervene into the operation of the internal combustion engine 2 using an open-loop control, respectively closed-loop control—by a suitable actuation of set-up agents associated with the internal combustion engine.

The motor vehicle 1 additionally comprises a mechanism 11, which is connected to the control unit 3 by way of a signal line 12. The mechanism 11 produces a torque reducing intervention into the engine management system of the internal combustion engine 2 and is, for example, designed as an additional control unit. The mechanism 11 can in this connection implement particularly one or multiple ESP functions. The mechanism 11 can furthermore be a control unit, which is assigned to a transmission and transmits a demand for reducing the torque to the control unit 3 via a signal line 12 if a gear changing operation is being implemented. It is additionally conceivable that the mechanism 11 performs the function of an overspeed trip unit. It is particularly conceivable that the mechanism 11 is implemented as a computer program and runs in the control unit 3.

A cylinder 4 is depicted boldly schematized in FIG. 2, which has a combustion chamber 13. A metering device 14 and an ignition device 15 are disposed at the cylinder 4 in the region of the combustion chamber 13. The metering device 14 is, for example, designed as a fuel injection valve, which allows for an injection of fuel, which is supplied by a fuel line 16, into the combustion chamber 13. It is additionally conceivable that the fuel injection valve is disposed in an unspecified intake manifold. The ignition device 15 is, for example, designed as a spark plug or a glow plug.

An intake valve 17 and an exhaust valve 18 are additionally disposed at the combustion chamber 13. The intake valve 17 is connected to the air intake system 5, and the exhaust valve 18 is connected to the exhaust gas system 6.

The operation of the metering device 14, the ignition device 15, the intake valve 15 as well as the exhaust valve 18 can be with respect to control operated in a closed-loop by means of the control unit 3 and the signal lines 10.

The operating mode of the internal combustion engine 2 according to the invention, respectively the control unit 3 according to the invention as well as the procedure according to the invention, is depicted exemplary in the flowchart shown in FIG. 3.

In step 100 a signal is acquired, respectively scanned. The signal is capable of describing a reduced torque demand. The signal is produced by the device 11, for example an ESP control unit. It is, however, also conceivable for the signal to be produced within a computer program running in the control unit 3, which, for example, is a mode of operation corresponding to the device 11.

In step 101 the control unit 3 checks to see if a reduced torque demand is present, thus to see if a corresponding signal was acquired in step 100. If this is not the case, the control unit 3 goes back to step 100.

If a reduced torque demand is present, a so-called reference torque is ascertained in step 102. The reference torque describes a base torque while taking into account the actual operating conditions of the internal combustion engine 2. The reference torque describes therefore the torque actually produced by the internal combustion engine.

In step 103 the reduction stage is ascertained, which describes the value, by which the reference torque of the internal combustion engine 2 is supposed to be reduced.

A test is made in step 104 to see if the reduction stage ascertained requires a cut off of the fuel to at least one cylinder 4. If, for example, the situation arises where the reduction stage is exactly zero or almost zero, a cut off of fuel can be abandoned and a return can be made to step 100. It is also conceivable in the case of only a relatively smaller reduction stage to achieve the reduction of the torque of the internal combustion engine 2 by a retardation of the ignition angle.

In step 105 the number of cylinders 4 is ascertained, whose fuel is supposed to be cut off. For this reason, data can, for example, be stored in one or several engine characteristic maps for every possible number of cylinders 4, which can be cut off. This is done in order to determine to what extent the actual torque is reduced if the fuel to the number of cylinders 4 affected, respectively their fuel-delivery control phase, is cut off. Provision can further be made in step 105 to select the number of cylinders 4, whose fuel supply is supposed to be cut off, in such a way that the best possible approach to the reduced torque demand is achieved.

In step 105 parameters inherent to the system can particularly be taken into account. These kinds of parameters can, for example, describe if a cylinder cutoff is possible only in individual groups of cylinders or is possible for individual cylinders.

In step 105, provision can also be made to determine which cylinders 4 are supposed to be cut off. This can take place from different perspectives. It is therefore conceivable to select the cylinders 4 in such a way that as smooth an operation as possible is guaranteed for the internal combustion engine 2.

In step 106 a test is made to see if the associated intake valves are supposed to be cut off. If the intake valves 17 are not supposed to be cut off, the cut off of the fuel-delivery control phase is thus initiated in step 112 by, for example, the cutting off of the fuel injection valves.

To implement the procedure according to the invention and to achieve its advantages, a cut off of one or several of the intake valves 17, which are associated with the cylinders 4 to be cut off, is, however, necessary. If the intake valves 17 are consequently supposed to be cut off, a test is thus made in step 107 to see if the associated exhaust valves 18 are also supposed to be cut off. The cut off of the exhaust valves 18 can basically prevent an air leakage out of the crankshaft housing from entering into the exhaust gas system 6. Additionally the overall efficiency of the internal combustion engine 2 can thereby be improved during the operation with reduced torque.

If only an especially short reduction of the torque is intended, respectively expected, a cut off of the exhaust valves 18 can possibly be abandoned. In this case, the procedure branches to step 108. In step 108 a synchronization of the signals to actuate the metering device 14 and the intake valve 17 is performed. At this point, the times to valve closure of the intake valve 17 are taken into account. Provision can be made, for example, in step 108 to ascertain the reaction time of the intake valves 17, i.e. the time between the transmission of a respective signal and the actual cut off of the intake valve 17. It can then be determined from this difference of times in which time interval the fuel injection valve and the intake valve 17 have to be actuated, so that a closing of the intake valve 17 and an interruption of the fuel supply occur simultaneously. For this reason the cut off of the intake valve 17 is then initiated in step 111, and the cut off of the metering device 14 in step 112.

If the test in step 107 determines that the exhaust valves 18, which are associated with the cylinders 4 to be cut off, are also supposed to be cut off, a synchronization of the actuation signals is thus performed in step 109. This takes place analogous to step 108; whereby at this point, the times to valve closure, respectively reaction times, of the exhaust valves 18 are taken into account.

In step 110 the respective exhaust valves 18, in step 111 the respective intake valves 17 and in step 112 the metering device are actuated in such a way that a closing of the intake valve 17 and the exhaust valve 18 as well as an interruption of the fuel supply occur simultaneously.

The form of embodiment exemplified in FIG. 2 can be implemented in altered forms of embodiment by the alteration of individual procedural steps or by an altered combination of the procedural steps.

It is, for example, conceivable already in step 103 to ascertain the number of cylinders 4, which are supposed to be cut off. For this purpose an engine characteristic map can again be evaluated. In step 104 a test can then be made to see if the number of cylinders 4 to be cut off is equal to zero. If this is the case, the procedure branches off to step 100. If the number of the cylinders to be cut off is greater than zero, the procedure, thus, branches off to step 105, and the cylinders to be cut off are selected or the procedure is directly continued in step 106.

Step 106 can, however, also be omitted; and provision can be made to always cut off at least the intake valve 17.

It is additionally possible to implement the procedure without step 107. For example, the cut off of the intake valves 17 and the exhaust valves 18 can then always be initiated in step 109 if the fuel supply is cut off; or the procedure is continued at regular intervals in step 108 instead of step 109 if it is intended to never cut off the exhaust valves 18. In this case the procedure is, of course, to be adapted accordingly. For example, the procedure then does not require the execution of step 111.

If provision is made not to implement a synchronization of the actuation signals during the cut off, the procedure can thus be implemented without steps 108 and/or 109.

The invention at hand provides then the advantage of improving the quality of the exhaust gas of the internal combustion engine 2. Additionally, the exhaust gas system 6 and particularly the catalytic converter 7 undergo less thermal stress.

If the metering device 14 is a fuel injection valve disposed in an intake manifold, the closing of the intake valves 17 then causes an interruption of the air-mass flow through the combustion chamber. A wall film located in the intake manifold breaks down significantly slower for that reason. When the affected cylinder is reactivated after completion of the torque reducing intervention, the wall film does not consequently have to be built up again. An enrichment of the fuel injection can therefore take place to a lesser extent, respectively be omitted. In so doing, an optimal quality of the exhaust gas can always be achieved, so that a reduction of the fuel consumption is achieved during the reactivation of the cylinders 4 and for this reason during the operation of the internal combustion engine 2.

The invention claimed is:

1. An internal combustion engine comprising at least one cylinder, a metering device assigned to the cylinder, and a mechanism configured to cease delivery of fuel to the at least one cylinder and close an intake valve and an exhaust valve of the at least one cylinder in response to a reduced torque demand, wherein one of the intake valve and exhaust value is closed synchronously upon ceasing delivery of fuel to the at least one cylinder.

2. A control unit for the open-loop and closed-loop control of an internal combustion engine having at least one cylinder, the control unit configured to acquire a reduced torque demand, cease delivery of fuel to the at least one cylinder, and close an intake valve and an exhaust valve of the at least one cylinder in response to the reduced torque demand, wherein one of the intake valve and exhaust value is closed synchronously upon ceasing delivery of fuel to the at least one cylinder.

3. A control unit according to claim 2, further comprising the control unit ascertaining a reduction stage and determining, as a function of the reduction stage, which has been ascertained, how many cylinders are to be cut off, which cylinders are to be cut off, if intake valves are to be cut off, and in the case intake valves are cut off, if exhaust valves are also to be cut off.

4. A control unit according to claim 2, wherein the control unit acquires a reduced torque demand from an electronic stability program, a transmission control system or an overspeed trip unit.

5. A method of operating an internal combustion engine including at least one cylinder, the method comprising:
    ceasing delivery of fuel to the at least one cylinder to reduce torque in response to a reduced torque demand; and
    closing an intake valve and an exhaust valve of the at least one cylinder, wherein one of the intake valve and exhaust value is closed synchronously with the ceasing delivery of fuel to the at least one cylinder.

6. A method according to claim 5, further comprising actuating one of the intake valve and exhaust valve as a function of a time to closure to implement the synchronous closing.

7. A method according to claim 5, further comprising ascertaining a reduction stage; and as a function of the reduction stage, which has been ascertained, and determining how many cylinders are cut off, which cylinders are cut off, if intake valves are cut off, or if intake valves are cut off, if exhaust valves are also cut off.

8. A method according to claim 5, wherein the reduced torque demand is produced by an electronic stability program, a transmission control system, or an overspeed trip unit.

9. A method according to claim 5, further comprising closing the intake valve and the exhaust valve is by one of: an electromechanical valve control system; an electro-hydraulic valve control system; and a mechanical servo-concept.

* * * * *